US011130711B2

(12) United States Patent
Meunier et al.

(10) Patent No.: US 11,130,711 B2
(45) Date of Patent: Sep. 28, 2021

(54) CASTABLE REFRACTORY COMPOSITIONS COMPRISING ZEOLITHIC MICROSTRUCTURES AND USES THEREOF

(71) Applicant: Calderys France, Issy les Moulineaux (FR)

(72) Inventors: Pierre Meunier, Lyons (FR); Nicolas Duvauchelle, Lyons (FR); Serge Martin-Calle, Rillieux-la-Pape (FR); Jérome Soudier, Vaux en Bugey (FR); Romain Techer, Villefontaine (FR)

(73) Assignee: ImerTech SAS, Paris (FR)

( * ) Notice: Subject to any disclaimer, the term of this patent is extended or adjusted under 35 U.S.C. 154(b) by 0 days.

(21) Appl. No.: 16/061,728

(22) PCT Filed: Dec. 15, 2016

(86) PCT No.: PCT/EP2016/081206
§ 371 (c)(1),
(2) Date: Jun. 13, 2018

(87) PCT Pub. No.: WO2017/102954
PCT Pub. Date: Jun. 22, 2017

(65) Prior Publication Data
US 2018/0362406 A1  Dec. 20, 2018

(30) Foreign Application Priority Data

Apr. 13, 2016  (FR) ..................... 1600622

(51) Int. Cl.
*C04B 28/06* (2006.01)
*B22D 41/02* (2006.01)
(Continued)

(52) U.S. Cl.
CPC .............. *C04B 28/06* (2013.01); *B22D 41/02* (2013.01); *C04B 28/005* (2013.01); *C04B 35/013* (2013.01); *C04B 35/043* (2013.01); *C04B 35/047* (2013.01); *C04B 35/101* (2013.01); *C04B 35/103* (2013.01); *C04B 35/105* (2013.01); *C04B 35/106* (2013.01); *C04B 35/12* (2013.01); *C04B 35/481* (2013.01); *C04B 35/482* (2013.01); *C04B 35/565* (2013.01); *C04B 35/6303* (2013.01); *C04B 35/66* (2013.01); *C04B 40/0042* (2013.01); *F27D 1/0006* (2013.01); *C04B 2103/12* (2013.01); *C04B 2103/22* (2013.01); *C04B 2103/408* (2013.01); *C04B 2103/608* (2013.01); *C04B 2111/00431* (2013.01); *C04B 2111/00551* (2013.01); *C04B 2111/1037* (2013.01); *C04B 2235/322* (2013.01); *C04B 2235/3208* (2013.01); *C04B 2235/422* (2013.01); *C04B 2235/425* (2013.01); *C04B 2235/428* (2013.01); *C04B 2235/444* (2013.01); *C04B 2235/448* (2013.01); *C04B 2235/449* (2013.01); *C04B 2235/48* (2013.01); *C04B 2235/5409* (2013.01); *C04B 2235/5427* (2013.01); *C04B 2235/5436* (2013.01); *C04B 2235/5445* (2013.01);
(Continued)

(58) Field of Classification Search
CPC ....... C04B 7/02; C04B 14/041; C04B 14/043; C04B 14/046; C04B 14/26; C04B 14/303; C04B 14/307; C04B 14/324; C04B 18/146; C04B 22/0013; C04B 22/16; C04B 24/04; C04B 24/06; C04B 24/2641; C04B 28/005; C04B 28/06; C04B 35/013; C04B 35/043; C04B 35/047; C04B 35/12; C04B 35/66; C04B 35/101; C04B 35/103; C04B 35/105; C04B 35/106; C04B 35/481; C04B 35/482; C04B 35/565; C04B 35/6303; C04B 40/0042; C04B 2103/12; C04B 2103/22; C04B 2103/408; C04B 2103/608; C04B 2111/00431; C04B 2111/1037; C04B 2111/00551; C04B 2235/48; C04B 2235/72; C04B 2235/96; C04B 2235/322; C04B 2235/428; C04B 2235/422; C04B 2235/425; C04B 2235/444; C04B 2235/448; C04B 2235/449; C04B 2235/3208; C04B 2235/5409; C04B 2235/5427; C04B 2235/5436; C04B 2235/5445; B22D 41/02; F27D 1/0006; Y02W 30/91; Y02W 30/94

See application file for complete search history.

(56) References Cited

U.S. PATENT DOCUMENTS 5,972,102 A * 10/1999 Vezza .................... C04B 28/06
106/692
2003/0150364 A1   8/2003 Orange et al.

FOREIGN PATENT DOCUMENTS

CN    102320849 A    1/2012
CN    102992795 A    3/2013
(Continued)

OTHER PUBLICATIONS

Vance et al "Steelplant Refractories Containing Alphabond Hydratable Alumina Binders" Alcoa Technical Bulletin (October). (Year: 1996).*

(Continued)

*Primary Examiner* — Anthony J Green
(74) *Attorney, Agent, or Firm* — Finnegan, Henderson, Farabow, Garrett & Dunner LLP

(57) ABSTRACT

The present invention relates to a dry refractory particulate composition comprising a zeolithic microstructure, to a green body and to a refractory lining formed therefrom, and to uses thereof.

18 Claims, 7 Drawing Sheets

(51) Int. Cl.

| | |
|---|---|
| *F27D 1/00* | (2006.01) |
| *C04B 35/66* | (2006.01) |
| *C04B 35/565* | (2006.01) |
| *C04B 35/01* | (2006.01) |
| *C04B 35/043* | (2006.01) |
| *C04B 35/63* | (2006.01) |
| *C04B 28/00* | (2006.01) |
| *C04B 35/047* | (2006.01) |
| *C04B 35/101* | (2006.01) |
| *C04B 35/106* | (2006.01) |
| *C04B 35/12* | (2006.01) |
| *C04B 35/103* | (2006.01) |
| *C04B 35/105* | (2006.01) |
| *C04B 35/48* | (2006.01) |
| *C04B 35/482* | (2006.01) |
| *C04B 40/00* | (2006.01) |
| *C04B 111/00* | (2006.01) |
| *C04B 111/10* | (2006.01) |
| *C04B 103/12* | (2006.01) |
| *C04B 103/22* | (2006.01) |
| *C04B 103/40* | (2006.01) |
| *C04B 103/60* | (2006.01) |

(52) U.S. Cl.
CPC ...... *C04B 2235/72* (2013.01); *C04B 2235/96* (2013.01); *Y02W 30/91* (2015.05)

(56) References Cited

FOREIGN PATENT DOCUMENTS

| | | | |
|---|---|---|---|
| CN | 104086198 A | 7/2014 | |
| CN | 104086198 A | * 10/2014 | ............. C04B 35/66 |
| CN | 104761268 A | 7/2015 | |
| JP | S-5384012 | 7/1978 | |
| JP | S-569272 | 1/1981 | |
| JP | H 10-182247 A | 7/1998 | |
| JP | H 10-182248 A | 7/1998 | |
| JP | H 10-259064 A | 9/1998 | |
| JP | H 10-291868 A | 11/1998 | |
| JP | H 11-171656 A | 6/1999 | |
| JP | 2002-213880 A | 7/2002 | |
| JP | 2004-508256 A | 3/2004 | |
| JP | 3920950 B2 | 5/2007 | |
| WO | WO 03033980 | 4/2003 | |
| WO | WO2011066842 A1 | 6/2011 | |
| WO | WO 2013/132442 A1 | 9/2013 | |

OTHER PUBLICATIONS

International Search Report and Written Opinion dated Mar. 22, 2017, in International Application No. PCT/EP2016/081206 (22 pgs.).
Database WPI, Thomson Scientific, London, GB, Week 201503, AN 2015-010247, XP002767980, CN 104 086 198 A (Ruitai Materials Technology Co Ltd), Oct. 8, 2014, 2 pages.
Myhre et al., "The use of microsilica in refractory castables", Proceedings of Intern Seminar on Monolithic Refractory Materials, Tehran, Iran, Jan. 1, 1997, pp. 113-140.
Nouri-Khezrabad et al., "Developing nano-bonded refractory catables with enhanced green mechanical properties", Ceramics International, Elsevier, Amsterdam, NL, vol. 41, No. 2, Nov. 4, 2014, pp. 3051-3057.
Otroj et al., "The effect of deflocculants on the self-flow characteristics of ultra low-cement castables in A1203-SiC-C system", Ceramics International, Elsevier, Amsterdam, NL, vol. 31, No. 5, Jan. 1, 2005, pp. 647-653.
De Oliveira et al., "Setting behavior of ultra-low cement refractory castables in the presence of citrate and polymethacrylate salts", Journal of the European Ceramic Society, Elsevier Science Publishers, Barking, Essex, GB, vol. 23, No. 13, Dec. 1, 2003, pp. 2225-2235.
Cem Gogtas et al., "Role of cement content on the properties of self-flowing A1203 refractory castables", Journal of the European Ceramic Society, vol. 34, No. 5, May 1, 2014, pp. 1365-1373.
Sarpoolaky et al., "Influence of in situ phase formation on microstructural evolution and properties of tastable refractories", Ceramics International, Elsevier, Amsterdam, NL, vol. 28, No. 5, Jan. 1, 2002, pp. 487-493.
Nouri-Khezrabad et al., "Nano-bonded refractory castables", Ceramics International, Elsevier, Amsterdam, NL, vol. 39, No. 4, Nov. 23, 2012, pp. 3479-3497.
V. Ya. Dzyuzer "Electrofused AZS Refractories for High-Capacity Glass-Founding Furnaces" Refractories and Industrial Ceramics, vol. 54, No. 4, Nov. 2013, pp. 304-306.

* cited by examiner

CASTABLE REFRACTORY COMPOSITIONS COMPRISING ZEOLITHIC MICROSTRUCTURES AND USES THEREOF

This application is a U.S. national phase entry under 35 U.S.C. § 371 from PCT International Application No. PCT/EP2016/081206, filed Dec. 15, 2016, which claims the benefit of priority of EP Application No. 15307027.1, filed Dec. 16, 2015, DE Application No. 10 2016 106 637.0, filed Apr. 11, 2016, FR Application No. 1600622, filed Apr. 13, 2016, and GB Application No. 1606554.2, filed Apr. 14, 2016, from all of which this application claims priority and all of which are incorporated herein by reference.

FIELD OF THE INVENTION

The present invention is directed to a dry refractory particulate composition comprising a zeothic microstructure, to a green body and to a refractory lining formed therefrom, and to the use thereof.

BACKGROUND OF THE INVENTION

Refractories are materials having properties that make them suitable for use as heat-resistant barriers in high temperature applications. Unshaped refractory materials have the ability to form joint-ness linings and are often referred to as monolithics. These materials are useful, for example, as linings for cupola hearths and siphons, blast furnaces, main, secondary and tilting runners, and more generally vessels or vessel spouts, ladles, tundishes, reaction chambers and troughs that contain, direct the flow of, or are suitable for facilitating industrial treatment of liquid metals and slags, or of any other high temperature liquids, solids or gases. Castable refractories are typically manufactured in powdered form and mixed with water prior to application. The wet material may be applied as a lining using techniques such as casting, spraying and gunning followed by setting and drying, prior to firing.

Refractory articles are commonly formed from a combination of refractory aggregate and a binder, whereby the binder holds the aggregates in place. Both the aggregate and binder can profoundly affect the properties of the article.

One class of binder is hydraulic binders, which include cement or other hydratable alumina. Unlike other types of binders, such as chemical binders, cementitious binders usually do not require heating to activate the binder, but they do require the addition of water. Water reacts with the cementitious binder to harden the mixture and also works as a dispersing medium for the fine powders and as a fluid to form a homogeneous body. Dry powders have poor flowability and are not suitable for forming refractory articles in the absence of high pressure. Water reduces the viscosity of the mixture, thereby permitting the aggregate/binder mixture to flow. The presence of water, however, can lead to problems such as the article cracking and even explosive vaporisation due to pressurized water during the heating up phase of refractory. An article having a cementitious binder often requires a drying step to eliminate residual water. In a attempt to overcome these problems, cement-free castables have been developed in the art for refractory industries.

WO 2013/032065, for example, describes refractories with a low cement content. The unshaped refractory disclosed includes the refractory mixture of alumina ($Al_2O_3$) and silicon carbide (SIC) to which one or more of alumina cement, zircon and an alumina binder is added. The small amount of cement and alumina binder in the disclosed refractories provide working flowability to the refractory mixture, and a small amount of the zircon significantly prevents corrosion by the calcium oxide (CaO) included in the cement in an amount of about 20%. Furthermore, US 2009/0071377 discloses a refractory concrete with low or ultra-low cement content, comprising silica fume. The silica fume is thought to contribute to the realisation of low-cement content dense concretes.

In addition, refractories containing no cement have also been described in the art. WO 2011/115352, for example, discloses an unshaped refractory with an alumina sol binder added to a refractory mixture comprising $Al_2O_3$ and SiC. Avoiding the use of CaO-containing cement eliminates corrosion by CaO even at high temperatures. In a further example, WO 2011/115353 discloses an alumina-bonded unshaped refractory including $Al_2O_3$, SiC and alumina precursor powder and water refractories that do not comprise CaO. A mixture containing an aggregate and a substance yielding a pH buffer as a refractory composition without the use of cement is also disclosed in US 2012/0142518. Furthermore, in U.S. Pat. No. 5,972,102 a hydraulically-bonded monolithic refractory containing a calcium oxide-free binder comprised of a hydratable alumina source and magnesium oxide is disclosed.

Despite the development of cement-tree castables, issues remain, such as long set-time/complex set-behaviour, inadequate green strength leading to handling problems, sometimes to drying problems as well as inadequate refractoriness or hot mechanical behaviour.

There remains the need to develop refractories with no cement or low cement content with improved properties.

SUMMARY OF THE INVENTION

The present invention is defined in the appended claims.
In accordance with a first aspect, there is provided a dry refractory particulate composition comprising:
  5% to 95% by weight of aggregate,
  1% to 8% by weight of silica fume,
  0.1% to 1.5% by weight of hydratable alumina,
  0.1% to 1% by weight of a calcium source, and
  0.01% to 1% by weight of dispersant,
  wherein the calcium oxide content is no greater than 0.3% by weight and all percentages by weight are based on the tota dry weight of the dry refractory composition.

In accordance with a second aspect, there is provided a use of the dry refractory particulate composition of the first aspect to form a refractory lining by installation in a large vessel. Large vessels may be a cement kiln, a lime kiln, an aluminium smelter or for steel processing, or on an object such as a trough, a runner, or a torpedo ladle for an iron blast furnace.

In accordance with a third aspect, there is provided a green body obtainable from the dry refractory particulate composition of the first aspect having a crushing strength of at least 6 MPa and a calcium oxide content of not greater than 0.3% by weight.

In accordance with a fourth aspect, there is provided a refractory lining obtainable from the dry refractory particulate composition of the first aspect, or the green body of the third aspect, or according to the use of the second aspect.

The present invention relates to mixtures suitable for use as a refractory, for example, as lining for large vessels such as a cement kiln, a lime kiln, an aluminium smelter or for steel processing, or for lining objects such as a trough, a runner, or a torpedo ladle or an iron blast furnace. The composition according to the invention is characterised, in part, by improved flowability, allowing facilitated installation and placement, whilst exhibiting reduced water demand and demonstrating a high crushing strength of the green body formed by the composition. The present invention has the advantage of a reduced the risk of damaging the refractory during formwork removal. The composition according the present invention is also characterized, in part, by a long working time, allowing safe and easy installation, whilst exhibiting rapid setting and quick green strength development kinetics, and allowing rapid and safe removal of formwork. The composition according the present invention is also characterized, in part, by a fast drying, which, associated to the high green strength, allows to reduce steam spalling or steam explosion risk during rapid or un-controlled drying and heating up.

The better flowability, better workability, shortened setting time, improved green strength, quick drying demonstrated by the composition of the present invention, that make installation and commissioning of resulting refractory lining easier and safer, are present in combination with improved final service properties of the refractory lining such as improved hot strength (HMOR) and higher hot-properties (RUL and capacity to resist to deformation under mechanical load) at elevated temperatures (1450-1700° C.). Due to the said combination of properties, the compositions according to present invention show overall improvements over compositions known in the art. In addition to the improved properties, disadvantages such as high costs of processing are also addressed by the present invention. Furthermore, compositions according to the invention that comprise silicon carbide and carbon can display improved corrosion resistance in comparison to the prior art.

BRIEF DESCRIPTION OF THE DRAWINGS

The invention will further be illustrated by reference to the following figures.

Figure 1:
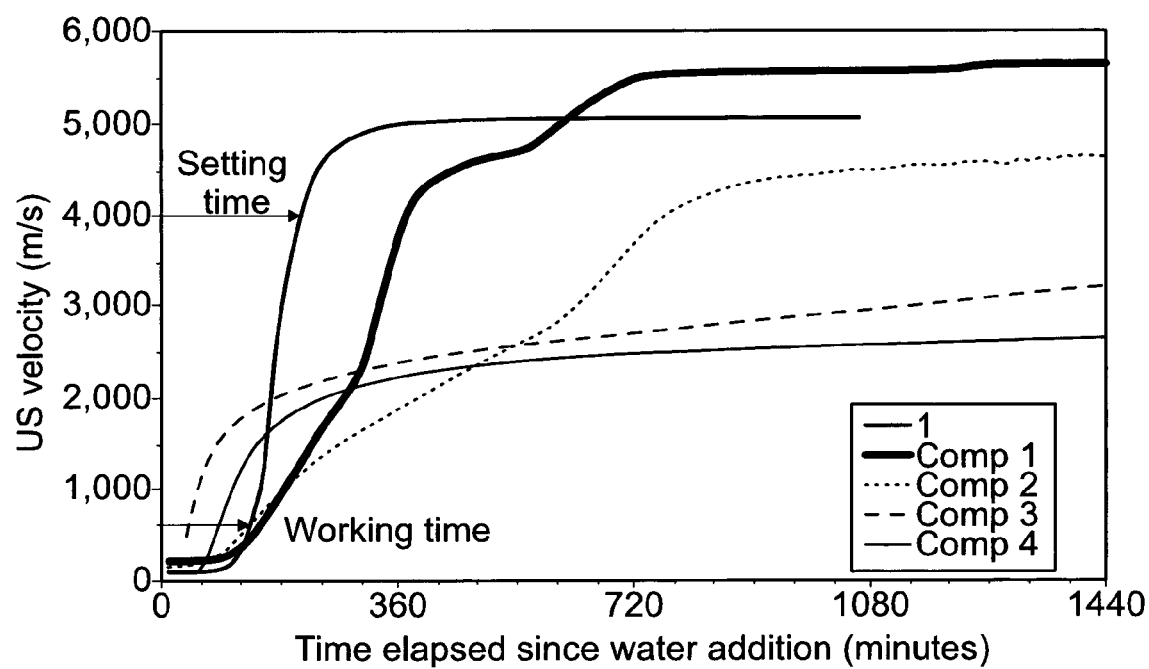
FIG. 1 is a graph representing the working and setting time as measured by ultrasonic velocity (Example 1 and Comparative Examples 1 to 4)

It is understood that the following description and references to the figures concern exemplary embodiments of the present invention and shall not be limiting the scope of the claims.

DETAILED DESCRIPTION

In accordance with the first aspect stated above, there is provided a dry refractory particulate composition. The composition is castable, which means that the refractory composition is formable into a joint-less or unshaped product upon addition of water, setting and drying to remove excess water.

As used herein, "dry" is to be understood as having a moisture level of no more than 0.5%, which for the dry refractory particulate composition is determined by weight loss after drying at 110° C.

The dry refractory particulate composition comprises about 5% to 95% by weight of aggregate, based on the total dry weight of the dry refractory composition. In an embodiment, the dry refractory particulate composition comprises about 40% to 90% by weight, for exempt, 60% to 90% by weight, or 40% to 80% by weight, or 40% to 70% by weight, or 70% to 90% by weight of aggregate. For example, the dry refractory particulate composition comprises about 40%, about 50%, about 60% or about 70% by weight of aggregate.

The aggregate may comprise a material selected from alumina, aluminosilicate, zirconia, zircon, magnesia, olivine, chromium oxide or chrome ores, spinel, silicon carbide or mixtures thereof. The alumina, aluminosilicate or mixtures thereof may comprise a material selected from brown fused alumina, sintered alumina, white fused alumina, calcined alumina, reactive or semi-reactive alumina, bauxite, fused or sintered mullite, andalusite and calcined chamotte having an alumina content of about 30 to 75% by weight.

The aggregate may comprise, consist essentially of, or consist of particles with a grain size distribution of between 0.08 and 30 mm in size, as determined by the amount of material retained on an appropriately sized sieve and is expressed as a percentage of the total initial dry mass of material. In embodiments, the aggregate comprises, consists essentially of, or consists of particles up to about 10 mm, or up to about 6 mm, or up to about 4 mm, or up to about 2 mm, or up to about 1 mm in size.

The dry refractory particulate composition comprises about 1% to 8% by weight of silica fume, based on the total dry weight of the dry refractory composition. In an embodiment, the dry refractory particulate composition comprises about 1% to 4% by weight, or 2% to 4% by weight, or 1% to 3% by weight, or 6% to 8% by weight of silica fume. For example, the dry refractory particulate composition comprises about 2%, about 3%, about 4%, about 5% by weight of silica fume.

As used herein, the term "silica fume" (CAS number 69012-64-2) designates an amorphous polymorph of silicon dioxide ($SiO_2$), which is a powder with median particle size, $d_{50}$, in the range of about 0.25 to 0.8 µm, or about 0.25 to 0.65 µm, or about 0.25 to 0.45 µm, or about 0.4 to 0.8 µm, or 0.4 to 0.6 µm as measured by sedimentation using a Sedigraph III, together with suitable dispersing agents and ultrasonic de-agglomeration, as known well known in the art. The silica fume may have a maximum particle size of about 1 µm.

As used herein, silica fume may have a BET surface area in the range of about 8 to 25 $m^2/g$, or about 12 to 25 $m^2/g$, or about 15 to 23 $m^2/g$, or about 17 to 20 $m^2/g$, or about 10 to 16 $m^2/g$, or about 13 to 18 $m^2/g$, as determined by nitrogen adsorption using the BET Specific Surface Area measurement method. Silica fume may be obtained as a by-product from the production of silicon, ferrosilicon or fused silica, for example. In particular, silica fume ray be derived from silicon production, from zirconia production or electrofused alumina zirconia silica production. The said production may be achieved by collecting the dust over an electric arc furnace.

The dry refractory particulate composition comprises about 0.1% to 1.5% by weight of hydratable alumina, based on the total dry weight of the dry refractory composition. In an embodiment, the dry refractory particulate composition may comprise about 0.5% to 1.5% by weight, or about 0.5% to 1% by weight, or about 1% to 1.5% by weight, or about 0.1% to 0.5% by weight of hydratable alumina.

As used herein, the term "hydratable alumina" refers to a transition alumina with a specific crystallinity. The product is over 85% alumina with a LOI of up to 15% and low sodium levels. In the presence of water, hydratable alumina will form $AH_3$ gel and $AH_{1-2}$ gel, wherein A stands for $Al_2O_3$, and H stands for $H_2O$. Upon heating the gels dehydrate and eventually form ceramic bonds.

As used herein, hydratable alumina may have a BET surface area in the range of about 200 to 350 $m^2/g$, or about 225 to 325 $m^2/g$, or about 250 to about 300 $m^2/g$, or about 275 to 350 $m^2/g$. Hydratable alumina may have a median particle size, $d_{50}$, in the range of about 3 to 10 μm, or about 2 to 9 μm, or about 3 to 8 μm or about 4 to 7 μm or about 5 to 6 μm as measured by laser diffraction using a Microtrac SRA 150.

In one embodiment, the hydratable alumina may comprise, consist essentially of, or consist of rho alumina.

The dry refractory particulate composition comprises about 0.1% to 1% by weight of a calcium source, based on the total dry weight of the dry refractory composition. In an embodiment, the calcium source in the dry refractory particulate composition may be from about 0.1% to 0.8% by weight, or from about 0.2% to 0.8% by weight, or from about 0.2% to 0.5% by weight, or from about 0.05% to 0.2% by weight, or from about 0.1% to 0.2% by weight, or from about 0.2% to 0.3% by weight. For example about 0.2%, 0.4%, 0.6% or 0.8% by weight of a calcium source.

The calcium source may be selected from calcium aluminate cement, Portland cement, hydrated lime, calcium sulfate, calcium acetate, calcium chloride, calcium chlorate or mixtures thereof.

The calcium oxide content of the composition is no greater than 0.3% by weight, based on the total dry weight of the dry refractory composition, as defined in EN 1402-3.

The calcium source may have a particle size of up to 80 microns in the case of cement (aluminous or Portland cement) and up to 200 microns for other sources, the maximum particle size being measured as described below.

The dry refractory particulate composition comprises about 0.01% to 1% by weight of dispersant, based on the total dry weight of the dry refractory composition. In one embodiment, the dry refractory particulate composition may comprise about 0.05% to 0.5% by weight, about 0.05% to 0.2% by weight, or about 0.1% to 0.2% by weight of dispersant. The dispersant may be selected from polyphosphate, polycarboxylate, polycarboxylate ether, polynaphtalene, polymelamine, polyglycol, lignosulfonate and citric acid.

The dry refractory particulate composition may include up to 0.1% by weight of a setting acceleration agent selected from lithium carbonate, lithium hydroxide, calcium aluminate, sodium silica, sodium aluminate, calcium hydroxide, sodium nitrate, sodium nitrite or mixtures thereof.

The dry refractory particulate composition may include a setting retardation agent selected from citric acid, sodium citrate, boric acid, oxalic acid, or mixtures thereof.

The dry refractory particulate composition may comprise a zeolithic bond, i.e. the formation of a zeolite, zeolites or zeolithic microstructure. Zeolites are crystalline, hydrated alumino-silicate of alkaline elements. Structurally they are made of infinitely extending mono-dimensional (as in mesotype—$3SiO_2.Al_2O_3.Na_2O_2H_2O$), bi-dimensional (such as in heulandite ($7SiO_2.Al_2O_3.CaO.6H_2O$) or more commonly tri-dimensional (such as in chabasite: $4SiO_2.Al_2O_3.CaO_6H_2$) networks of $(Si,Al)O_4$ tetrahedra, which constitute the primary building units, that are connected by metal cations. This infinitely extending structure leads to the classification of zeolites as inorganic polymers.

The above mentioned networks are characterized by the presence of large monovalent or divalent ions such as $Na^+$, $K^+$, $Ca^{2+}$ or $Mg^{2+}$ distorting the organization of $(Si,Al)O_4$ tetrahedra and responsible for the distribution of large interconnected voids spaces within the framework.

Zeolites and the zeolithic microstructures thereof may be characterized by their alumina silica network, the presence of large interconnected void spaces and containing metal cations such as $Ca^{2+}$.

Zeolites and zeolithic microstructures may exhibit the following properties: i) formation of microstructure, i.e. connection of $(Si,Al)O_4$ tetrahedra, governed by the presence and by the concentration of cations; ii) infinitely extending tri-dimensional microstructure, resulting from repetition of an identical constitutive pattern; iii) micro porosity, i.e. low intrinsic density and large void volume after dehydration, the voids are filled with water prior to dehydration. The porosity is characterized by the fact that the voids are essentially uniform in size and highly interconnected; and iv) dehydration occurs without modification of the microstructure, destruction of the network or modification of the aluminosilicate skeleton.

Zeolites and zeolithic microstructures exhibit bonding of refractory monolithics described in the present invention, which, without wishing to be bound by theory, are thought to be responsible for improved properties of the current invention over known compositions.

The dry refractory particulate compositions of the current invention differs from known refractory compositions such as those based on the formation of hydrous gels. This may be attributed to the bonding systems of the prior art being based on (i) destabilization and coagulation of silica colloids sols; (ii) coagulation of micro-silica particles by alkali hearth metals oxides or hydroxides dissolved or partially dissolved; and (iii) magnesium-silicate hydrous gel formation. In the case of point (i), the reaction between silica colloids by formation of hydroxyl bonds between particles (Si—O—H—O—Si) starts as soon as silica sols come in contact with impurities disturbing it initial stabilization, i.e. a decrease in flowability starts as soon as silica sol has been mixed with the refractory particulate compositions. In the case of points (ii) and (iii), the decrease in flowability is due to the reaction between fine surface hydroxylated silica particles and the formation of Si—O-meta cation-O—Si bonds (the metal cation being commonly $Mg^{2+}$ in case of (iii), and being commonly $Ca^{2+}$, $Mg^{2+}$ and/or $Ba^{2+}$ in case of (ii)) as soon as the dry refractory composition has been mixed with water.

The green body obtainable from the dry refractory particulate composition according to the first aspect may have a green crushing strength of at least about 6 MPa. In one embodiment the crushing strength is at least from about 6 to 15 MPa, from about 6 to 12 MPa, from about 8 to 15 MPa, from about 8.0 to 10 MPa, or from about 13 to 15 MPa.

Without wishing to be bound by theory, we note that the high mechanical strength of the green bodies made of the present invention may be attributed to the zeolithic crystalline tri-dimensional framework undergoing dehydration without modification of the microstructure, destruction of the network or modification of the alumino-silicate skeleton. In particular, the level of strength reached by formation of zeolithic microstructure is not affected by the quantity of liquid water remaining in the system after formation of bond and during drying (i.e. during vaporization of water). Once again, this differs from known refractory composition such as the ones based on formation of hydrous gels (see (i), (ii) and (iii) above) as the hydrous gel are by definition affected by removal of water. In such systems, removal of water present in hydrous gels formed, results in strong shrinkage of gel structure formed during bond, which results in high micro-cracking of the initially bonding phase.

In addition, without wishing to be bound by theory, it is thought that the zeolite and the zeolithic microstructure provides a high strength bond, ensuring a high level of strength for the refractory green body may be due to the infinitely extending tri-dimensional microstructure resulting from repetition of an identical constitutive pattern (i.e. the crystalline structure). This is particularly different from other known refractory compositions such as the ones based on formation of hydrous gels (see (i), (ii) and (iii) above), that form amorphous structure (gels) exhibiting resultantly low strength refractory green body.

In addition, without wishing to be bound by theory, it is thought that the zeolite and the zeolithic microstructure provides a high strength bond, ensuring a high level of strength for the refractory green body may be due to the infinitely extending tri-dimensional microstructure resulting from repetition of an identical constitutive pattern (i.e. the crystalline structure). This is particularly different from other known refractory compositions such as the ones based on formation of hydrous gels (see (i), (ii) and (iii) above), that form amorphous structure (gels) exhibiting resultantly low mechanical strength and low green strength refractory green body.

The dry refractory particulate composition may have a working time ranging from about 30 to 240 min at 20° C. measured using UltraTest IP-8. In one embodiment the dry refractory particulate composition has a working time ranging from about 40 to 220 min, from about 60 to 200 min, from about 80 to 180 min, from about 100 to 160 min, from about 120 to 140 min at 20° C. measured using UltraTest IP-8.

Without wishing to be bound by theory, it is thought that the long working time without deterioration of the flowability can be attributed to the zeolites and zeolithic structures. As discussed above, the formation of zeolites and zeolithic microstructure, i.e. the $(Si,Al)O_4$ tetrahedra, is governed by presence and by the concentration of cations, e.g. the solubilization kinetic of the calcium source and concentration of calcium cation reached after solubilization. The connection of $(Si,Al)O_4$ tetrahedra by metallic cations and especially $Ca^{2+}$ ions to form a zeolithic microstructure, occurs when the solubilisation of the calcium source has reached a given minimum concentration of $Ca^{2+}$ ions in the system. Time needed to reach this given minimal concentration of $Ca^{2+}$ permits a long dormant period (i.e. no formation of new species and no creation of bonds between particulates). This is also called the "working time", which is the time elapsed after mixing with a liquid without deterioration of flowability.

The dry refractory particulate composition may have a setting time ranging from about 1 to 12 hours at 20° C. measured using UltraTest IP-8. In one embodiment the dry refractory particulate composition has a setting time ranging from about 2 to 10 hours, from about 3 to 8 hours, from about 4 to 6 hours at 20° C. measured using UltraTest IP-8.

The dry refractory particulate composition may have a total amount of bonded water lower than about 0.7%, or about 0.65%, or about 0.6% or about 0.55%, as measured by the mass % of water released between 110° C. and 800° C.

The dry refractory particulate composition may have a good drying aptitude with a degree of unidirectional drying higher than about 30%, or about 32%, or about 35% or about 38% or about 40% after 5 hours as measured in a moisture tight cylindrical mould open and heated on one side to 500° C.

As discussed above, the formation of zeolites and zeolithic microstructures results in infinitely extending tridimensional microstructure, which are not affected by dehydration and are characterized by the presence of uniformly sized voids (porosity) exhibiting high interconnectivity. Without wishing to be bound by theory, these properties are thought to results in the high dry-ability of the compositions of the present invention. High dry-ability can be expressed as the capability to be dried quickly and/or safely (i.e. reduced risk of explosion resulting from pressurized water during the heating up phase of refractory).

High dry-ability can be obtained by combination of (I) high strength of green body (capability to resist to stresses resulting from pressurized water), (II) capability of the green body to exhibit high strength whatever quantity of remaining water is present during drying, and (III) capability of water to escape from microstructure without generating excessive steam pressure (i.e. high permeability to gas).

Criteria (I) and (II) have already been detailed above, as well as compared to known refractory composition (i) and (ii), which results in the compositions of the present invention having a higher capability to resist stresses resulting from pressurized water than known refractory compositions.

Furthermore, low intrinsic density i.e. large void volume, uniform size and interconnected porosity of the zeolite and zeolithic microstructure of the bond provides the present invention with an increased permeability to gas versus known compositions. The increased permeability results from the low tortuosity of porosity (uniformly sized, high interconnectivity) of the dry refractory particulate composition of the current invention, especially when comparing to known cement bonded refractories.

Cement bonded monolithics refractories, whether medium cement (MCC:CaO>2.5%), low cement (LCC: 1%<CaO<2.5%) or ultra low cement (ULCC 0.2%<CaO<1%) castables, exhibit a matrix microstructure with low porosity, low interconnectivity of pores and resultantly a low permeability to gas, which is due to the formation of calcium aluminate needles during cement hydration.

In one embodiment, the dry refractory particulate composition of the first aspect further comprises about 5% to 50% by weight of silicon carbide, and up to 10% by weight carbon. In one embodiment the dry refractory particulate composition comprises about 10% to 50% by weight, about 20% to 50% by weight, about 20% to 40% by weight, about 40% to 50% by weight, or about 25% to 35% by weight of silicon carbide. In a further embodiment the dry refractory particulate composition comprises from about 0.1% to 1% by weight, from about 2% to 20% by weight, from about 5% to 10% by weight, from about 2% to 8% by weight, from about 2% to 6% by weight, from about 4% to 6% by weight, from about 2% to 4% by weight, or from about 1% to 5% by weight of carbon.

The carbon may comprise a material selected from carbon black, pitch, petroleum pitch, graphite, coke, solid hydrocarbon having a carbon residue of at least about 5% by weight after coking, asphalts or a combination thereof. The graphite may be mono-crystalline or polycrystalline (also known as "amorphous graphite") and may comprise particles of up to about 1 mm in size, as determined by sieve analysis. The carbon black may comprise particles having a $d_{50}$ of up to about 100 μm, for example, up to about 75 μm of, for example, up to about 50 μm. The particles of carbon black may have a maximum specific surface area of about 50 $m^2/g$, as determined by nitrogen adsorption using the BET Specific Surface Area measurement method. The coke may comprise particles of up to about 2 mm in size, as determined by sieve analysis. The solid hydrocarbon may have a carbon residue of at least about 10% by weight after coking. It may be in a powdered form comprising particles up to about 2 mm in size, as determined by sieve analysis. Examples of solid hydrocarbons are pitch, petroleum pitch, bitumen, asphalts, phenolic based resins and synthetic polymers or oligomers.

The dry refractory particulate composition may further comprise an additive or additives to suppress or prevent oxidation of the carbon. An additive or additives to suppress or prevent oxidation of carbon are hereinafter referred to as an antioxidant. In an embodiment the dry refractory particulate composition may comprise about 5% by weight an antioxidant based on the total dry weight of the dry refractory particulate composition. In a further embodiment, the dry refractory particulate composition comprises no more than 4% by weight of antioxidant, no more than 3% by weight of antioxidant, no more than 2% by weight of antioxidant, or no more than 1% by weight of antioxidant. In another embodiment, the dry refractory particulate composition comprises about 0.1 to 1% by weight, or 0.2% to 0.6% by weight of an antioxidant. The antioxidant may be selected from aluminium nitride, aluminium oxy-nitride, boron carbide, zirconium carbide, calcium carbide, metals that include aluminium, silicon, magnesium, iron, chromium, zirconium, their alloys and mixtures thereof. In an embodiment, the antioxidant is not metallic.

The dry refractory particulate composition may further comprise 0.1% to 0.8% by weight of a drying additive and/or 0.01% to 0.12% by weight of organic fibres. The drying additive may be selected from reactive metal such as aluminium, magnesium, silicon and their alloys or mixtures thereof. The organic fibres may be selected from polyethylene fibres or polypropylene fibres.

In accordance with a second aspect, there is provided a use of a dry refractory particulate composition of the first aspect to form a refractory lining by installation a large vessel such as a cement kiln, a lime kiln, an aluminium smelter or for steel processing, or on an object such as a trough, a runner, or a torpedo ladle for an iron blast furnace. In one embodiment the dry refractory particulate composition used for steel processing, cement kiln, a lime kiln and an aluminium smelter are compositions that are essentially free of silicon carbide and carbon. In one embodiment the dry refractory particulate composition used and for troughs, runner or torpedo ladle for an iron blast furnace comprise about 5% to 50% by weight of silicon carbide, and up to 10% by weight carbon.

The installation may be carried out by casting, spraying and gunning followed by setting and drying, prior to firing. In one embodiment, installation is carried out by gunning, wherein the gunning can be either wet or dry.

In accordance with a third aspect, there is provided a green body obtainable from the dry refractory particulate composition of the first aspect having a crushing strength of at least about 6 MPa and a calcium oxide content of not greater than about 0.3% by weight. In one embodiment the crushing strength is at least from about 6 to 15 MPa, from about 6 to 12 MPa, from about 8 to 15 MPa, from about 8.0 to 10 MPa, or from about 13 to 15 MPa.

In accordance with a fourth aspect, there is provided a refractory lining obtainable from the dry refractory particulate composition of the first aspect, or the green body of the third aspect, or according to the use of the second aspect.

The refractory lining of the fourth aspect may have a porosity after firing at 1000° C. of not more than 21%, or no more than 20% or no more than 19%, measured according to the ISO 5017 for determining porosity.

The refractory lining of the fourth aspect may have a Hot Modulus of Rupture (HMOR) of at east about 3.5 MPa.

The formation of zeolites and zeolithic microstructures can be achieved with low ratio of cations for bridging $(Si,Al)O_4$ tetrahedra. The dry refractory particulate compositions of the present invention are essentially free of alkali hearth metal oxides such as MgO, or BaO and essentially free of alkali metal oxide such as $K_2O$ or $Na_2O$, and contain very low level of lime (CaO<0.3%). Such composition, essentially of the binary system ($Al_2O_3$, $SiO_2$) permits very high refractoriness to be reached as expressed by Refractoriness Under Load or by Hot Modulus of Rupture. Known refractory compositions exhibit lower refractoriness, which is due to the relative higher ratio of compounds prone to formations of a low temperature liquid phase when associated to alumina and silica, such as MgO, BaO, CaO, $K_2O$ and $Na_2O$.

This is particularly the case for cement bonded refractory compositions such as low cement castables (CaO>1%) or medium cement castables (CaO>2.5%).

This is particularly the case as well for refractories bonded by coagulation of micro silica particles by alkali hearth metals oxides or hydroxides (see refractory bonding system (ii) above), that contains up to 5% of CaO, and/or BaO, and/or MgO).

The refractory lining according to the fourth aspect may be used in steel processing, a cement kiln, a lime kiln, an aluminium smelter, a trough, a runner or torpedo ladle for an iron blast furnace. In one embodiment the dry refractory particulate composition used for steel processing, cement kiln, a lime kiln and an aluminium smelter are compositions that are essentially free of silicon carbide and carbon. In one embodiment the dry refractory particulate composition used for troughs, runner or torpedo ladle for an iron blast furnace comprise about 5% to 50% by weight of silicon carbide, and up to 10% by weight carbon.

As used herein, the term "substantially free" refers to the total absence of or near total absence of a specific compound or composition. For example, when a composition is said to be substantially free from colloidal silica, there is either no colloidal silica in the composition or only trace amounts of colloidal silica. A person skilled in the art will understand that a trace amount is an amount which may be detectable but not quantifiable and, if present, would not adversely affect the properties of the dry refractory particulate composition.

In a further embodiment the dry refractory particulate composition is substantially free of colloidal silica, silica sol, colloidal alumina, pyrogenic silica (e.g. silica resulting from oxidation of Si-containing salt aerosols and exhibiting a BET specific surface of greater than 50 $m^2/g$ also known as fumed silica), and/or oxides and/or hydroxides of magnesium or barium consisting essentially of particle having a $d_{50}$ of less than about 100 μm.

In a further embodiment the dry refractory particulate composition comprises an organic binder, such as polyacrylic acid, in an amount of no more than 1.0% by weight, preferably no more than 0.5% by weight. In a further embodiment the dry refractory particulate composition is substantially free of an organic binder.

For the avoidance of doubt, the present application is directed to subject-matter described in the following numbered paragraphs.

1. A dry refractory particulate composition comprising:
   5% to 95% by weight of aggregate,
   1% to 8% by weight of silica fume,
   0.1% to 1.5% by weight of hydratable alumina,
   0.1% to 1% by weight of a calcium source, and
   0.01% to 1% by weight of dispersant,
   wherein the calcium oxide content is no greater than 0.3% by weight and all percentages by weight are based on the total dry weight of the dry refractory composition.
2. The dry refractory particulate composition of numbered paragraph 1 wherein a green body obtained therefrom has a green crushing strength of at least 6 MPa.
3. A dry refractory particulate composition comprising:
   5% to 95% by weight of aggregate,
   1% to 4% by weight of silica fume,
   0.1% to 1.5% by weight of hydratable alumina,
   0.1% to 1% by weight of calcium source,
   0.01% to 1% by weight of dispersant,
   5% to 50% by weight silicon carbide, and
   up to 10% by weight carbon, wherein all percentages by weight are based on the total dry weight of the dry refractory composition.
4. The dry refractory particulate composition of numbered paragraph 3 wherein a green body obtained therefrom has a green crushing strength of at least 6 MPa and a calcium oxide content of no more than 0.3% by weight.
5. The dry refractory particulate composition of numbered paragraph 3 or 4 comprising 1% to 10% by weight carbon.
6. The dry refractory particulate composition of any one of numbered paragraph 3 to 5 wherein the carbon is selected from carbon black, pitch, petroleum pitch, graphite, coke, sold hydrocarbon having a carbon residue of at least about 5% by weight after coking, asphalts or a combination thereof.
7. The dry refractory particulate composition of any one of numbered paragraphs 3 to 6 further comprising up to 5% by weight of an antioxidant.
8. The dry refractory particulate composition of numbered paragraph 7 wherein the antioxidant is selected from aluminium nitride, aluminium oxynitride, boron carbide, zirconium carbide, calcium carbide, metals that include aluminium, silicon, magnesium, iron, chromium, zirconium, their alloys and mixtures thereof.
9. The dry refractory particulate composition of any one of numbered paragraphs 7 or 8 wherein the antioxidant is not metallic.
10. The dry refractory particulate composition of any one of numbered paragraphs 3 to 9 further comprising 0.1% to 0.8% by weight of a drying additive.
11. The dry refractory particulate composition of numbered paragraph 10, wherein the drying additive is selected from a reactive metallic powder such as aluminum, magnesium, silicon or an alloy thereof.
12. The dry refractory particulate composition of any one of numbered paragraphs 3 to 11 further comprising 0.01% to 0.12% by weight of organic fibres.
13. The dry refractory particulate composition of numbered paragraph 2, wherein the organic fibres are selected from polyethylene fibres or polypropylene fibres.
14. The dry refractory particulate composition of any preceding numbered paragraph, wherein the aggregate is selected from alumina, aluminosilicate, zirconia, zircon, magnesia, olivine, chromium oxide or chrome ores, spinel, silicon carbide, or mixtures thereof.
15. The dry refractory particulate composition of any preceding numbered paragraph, wherein the calcium source comprises calcium aluminate cement.
16. The dry refractory particulate composition of any preceding numbered paragraph, wherein the calcium source comprises Portland cement.
17. The dry refractory particulate composition of any preceding numbered paragraph, wherein the calcium source comprises a material selected from hydrated lime, calcium sulfate, calcium acetate, calcium chloride, calcium chlorate, or mixtures thereof.
18. The dry refractory particulate composition of any preceding numbered paragraph, wherein the calcium source has a particle size of up to 200 microns.
19. The dry refractory particulate composition of numbered paragraph 18, wherein the calcium source is calcium aluminate cement or Portland cement with a particle size of up to 80 microns.
20. The dry refractory particulate composition of any preceding numbered paragraph, further including up to 0.1% by weight of a setting acceleration agent.
21. The dry refractory particulate composition of numbered paragraph 20, wherein the setting acceleration agent is selected from lithium carbonate, lithium hydroxide, calcium aluminate, sodium silicate, sodium aluminate, calcium hydroxide, sodium nitrate, sodium nitrite or mixtures thereof,
22. The dry refractory particulate composition of any preceding numbered paragraph, further including a setting retardation agent selected from citric acid, sodium citrate, boric acid, oxalic acid, or mixtures thereof.
23. The dry refractory particulate composition of any preceding numbered paragraph, wherein the aggregate has a grain size distribution between 0.08 mm to 25 mm.
24. The dry refractory particulate composition of any preceding numbered paragraph, comprising 40% to 90% by weight aggregate.
25. The dry refractory particulate composition of any preceding numbered paragraph, comprising 0.5% to 1.5% by weight hydratable alumina.
26. The dry refractory particulate composition of any preceding numbered paragraph, comprising no more than 1.0% by weight of organic binder.
27. The dry refractory particulate composition of any preceding numbered paragraph, comprising no more than 0.5% by weight of organic binder.
28. The dry refractory particulate composition of any preceding numbered paragraph, which is substantially free of organic binder.
29. The dry refractory particulate composition of any preceding numbered paragraph wherein the calcium oxide content is between 0.05 to 0.3% by weight.
30. The dry refractory particulate composition of any preceding numbered paragraph, comprising 0.05% to 0.5% by weight of dispersant.
31. The dry refractory particulate composition of numbered paragraph 30 wherein the dispersant is selected from polyphosphate, polycarboxylate, polycarboxylate ether, polynaphtalene, polymelamine, polyglycol, lignosulfonate and citric acid.

32. The dry refractory particulate composition of any preceding numbered paragraph, wherein the hydratable alumina has a BET surface area in the range of 200 to 350 m$^2$/g.
33. The dry refractory particulate composition of any preceding numbered paragraph, wherein the hydratable alumina has a median particle size, d$_{50}$, in the range of 3 to 10 μm, as measured by laser diffraction using a Microtrac SRA 150.
34. The dry refractory particulate composition of any preceding numbered paragraph, wherein the hydratable alumina includes rho alumina.
35. The dry refractory particulate composition of any preceding numbered paragraph, wherein the silica fume has a BET surface area in the range of 8 to 25 m$^2$/g.
36. The dry refractory particulate composition of any preceding numbered paragraph, wherein the silica fume has a median particle size, d$_{50}$, in the range of 0.25 to 0.8 μm as measured by sedimentation using a Sedigraph III.
37. The dry refractory particulate composition of any preceding numbered paragraph, wherein the silica fume comprises a silica fume derived from silicon production.
38. The dry refractory particulate composition of any preceding numbered paragraph, wherein the silica fume comprises a silica fume derived from a zirconia production or electrofused alumina zirconia silica production.
39. The dry refractory particulate composition of any preceding numbered paragraph, having a working time ranging from 30 to 240 min at 20° C. measured using UltraTest IP-8.
40. The dry refractory particulate composition of any preceding numbered paragraph, having a setting time ranging from 1 to 12 hrs at 20° C. measured using UltraTest IP-8.
41. The dry refractory particulate composition of any preceding numbered paragraph, having a total amount of bonded water lower than 0.7% as measured by the relative water released between 110° C. and 80° C.
42. The dry refractory particulate composition of any preceding numbered paragraph, having a good drying aptitude, with a degree of unidirectional drying higher than 30% after 5 hours as measured in a moisture tight cylindrical mould heated to 500° C. on its open face.
43. The dry refractory particulate composition of any preceding numbered paragraph, wherein the composition comprises a zeolithic microstructure.
44. The dry refractory particulate composition of numbered paragraph 43, wherein the zeolithic microstructure is mono-dimensional, bi-dimensional, or tri-dimensional
45. A dry refractory particulate composition comprising:
    5% to 95% by weight of aggregate,
    1% to 8% by weight of silica fume,
    0.1% to 1.5% by weight of hydratable alumina,
    0.1% to 1% by weight of a calcium source, and
    0.01% to 1% by weight of dispersant,
    wherein the calcium oxide content is no greater than 0.3% by weight, wherein the composition comprises a zeolithic microstructure and all percentages by weight are based on the total dry f dry refractory composition.
46. A dry refractory particulate composition comprising:
    5% to 95% by weight of aggregate,
    1% to 4% by weight of silica fume,
    0.1% to 1.5% by weight of hydratable alumina,
    0.1% to 1% by weight of calcium source,
    0.01% to 1% by weight of dispersant,
    5% to 50% by weight silicon carbide, and
    up to 10% by weight carbon
    wherein the composition comprises a zeolithic microstructure and all percentages by weight are based on the total dry weight of the dry refractory composition.
47. A dry refractory particulate composition comprising a zeolithic microstructure, wherein a zeolithic microstructure is obtainable by setting the dry refractory particulate composition of any of the preceding numbered paragraphs.
48. A green body obtainable from the dry refractory particulate composition of any preceding numbered paragraph, having a crushing strength of at least 6 MPa.
49. A refractory lining obtainable from the dry refractory particulate composition or the green body of any preceding numbered paragraph.
50. The refractory lining of paragraph 49 having a Hot Modulus of Rupture of at least 3.5 MPa, as measured at 1450° C., after a pre-treatment of the refractory at 1450° C. for 5 hours.
51. The refractory lining according to paragraph 50, wherein the dry refractory particulate composition or the green body comprises 5% to 50% by weight silicon carbide, and up to 10% by weight carbon.
52. The refractory lining of paragraph 49 or 51 having a porosity after firing at 1000° C. of not more that 21% measured according to the ISO 5017 for determining porosity.
53. The refractory lining of any one of the numbered paragraphs 49 to 52 for use in a steel processing, a cement kiln, a lime kiln, or an aluminum smelter.
54. A method of installing a dry refractory particulate composition as described any preceding numbered paragraph 1 to 47 comprising the use of gunning.
55. The method of numbered paragraph 54, wherein the gunning is either dry or wet.
56. A trough or runner or torpedo ladle for an iron blast furnace, comprising a dry refractory particulate composition in accordance with any preceding numbered paragraph.

EXAMPLES

Dry refractory particulate compositions according to the present invention were prepared and compared to state of the art compositions. In order to have a direct and meaningful comparison in both Examples 1 and 2, all compositions in each comparison have the same grain skeleton made of respectively tabular alumina and brown fused alumina. The compositions were prepared by mixing together components as shown in Table 1 and Table 2, in order to obtain compositions according to the invention (Examples 1 and 2) and compositions known in the art (Comparative Examples 1 to 6).

TABLE 1

| Example No. | 1 | Comp 1 | Comp 2 | Comp 3 | Comp 4 |
| --- | --- | --- | --- | --- | --- |
| Sintered & calcinated alumina | 91% | 91% | 93% | 93% | 97% |
| Silica fume | 6% | 5% | 5% | 5% | — |
| Type of binder | New | CA Cement | CA Cement | "Quick Dry" | Colloidal Silica |

TABLE 1-continued

| Example No. | 1 | Comp 1 | Comp 2 | Comp 3 | Comp 4 |
|---|---|---|---|---|---|
| CaO + MgO | 0.14% | 1.4% | 0.35% | 0.41% | 0.10% |
| Tabular alumina 3-6 mm | 36% | — | — | — | 36% |
| Tabular alumina 1-3 mm | 12% | — | — | — | 12% |
| Tabular alumina 0-1 mm | 21% | — | — | — | 21% |
| Tabular alumina 0-0.3 mm | 10.4% | — | — | — | 10.4% |
| Tabular alumina 0-0.045 mm | 2% | — | — | — | 4% |
| Fine ground calcinated alumina | 9.98% | — | — | — | 15.45% |
| Quartz 0-0.1 mm | 1% | — | — | — | 1% |
| Silica fume | 6% | — | — | — | — |
| Hydratable alumina | 1% | — | — | — | — |
| Calcium aluminate cement 70% $Al_2O_3$ | 0.5% | — | — | — | — |
| Dead burnt magnesia 0-0.45 mm | — | — | — | — | 0.10% |
| Lithium carbonate | 0.03% | — | — | — | — |
| Modified poiycarboxylate | 0.09% | — | — | — | 0.05% |
| Colloidal Silica (liquid/powder ratio) | — | — | — | — | 7.65% |
| Water (water/powder ratio) | 3.8% | 3.8% | 3.8% | 5.0% | — |

CALDE™ CAST LT 95 (Comparative Example 1; Comp 1), CALDE™ CAST UT 94 (Comparative Example 2; Comp 2) and CALDE® CAST NT 92 QD (Comparative Example 3; Comp 3) are commercial products manufactured by CALDERYS. QD stands for Quick Dry; QD is a trademark registered by CALDERYS. The binder used in the QD composition Is based on a mixture of several components such as silica fume, alkaline earth metal and/or hydroxide and cementitous binder. CA stands for calcium aluminate. The materials in the examples are prepared with the specified liquid (water or colloidal silica) addition, expressed as the ratio liquid/powder.

TABLE 2

| Example No. | 2 | Comp 5 | Comp 6 |
|---|---|---|---|
| Type of binder | New | CA Cement | Colloidal silica |
| Carbon sources | 3.3% | 3.3% | 3.3% |
| Silicon carbide | 25% | 25% | 25% |
| Silica fume | 2% | 2% | No |
| Drying agent | Al | Al | No |
| CaO | 0.2% | 0.5% | 0.1% |
| Brown fused alumina (0.5-10 mm) | 60% | — | — |
| Silicon carbide (0-1 mm) | 25% | — | — |
| Calcined alumina | 4.15% | — | — |
| Semi reactive alumina | 3.0% | — | — |
| Graphite (0-0.6 mm) | 1.3% | — | — |
| Carbon black | 1.3% | — | — |
| Solid hydrocarbon (0-0.2 mm) | 0.7% | — | — |
| Silicon metal (0-0.2 mm) | 0.5% | — | — |
| Silica fume | 2.0% | — | — |
| Aluminium metal (0-0.1 mm) | 0.4% | — | — |
| Calcium aluminate cement | 0.5% | — | — |
| Hydratable alumina | 1.0% | — | — |
| Dispersant | 0.15% | — | — |
| Colloidal Silica (liquid/powder ratio) | — | — | 7.3% |
| Water (water/powder ratio) | 4.0% | 4.1% | — |

CALDE™ CAST G 6 P (Comparative Example 5; Comp 5) and CALDE™ GCNV 2010 (Comparative Example 6; Comp 6) are commercial products manufactured by CALDERYS Example 1 is a composition according to the invention that does not comprise silicon carbide or carbon black, whereas Example 2 comprises both silicon carbide and carbon black. Comparative Examples 1 to 4 do not comprise silicon carbide and carbon black, and Comparative Examples 5 and 6 comprise both silicon carbide and carbon black. Comparative Example 1 relates to a low cement castable (LCC), Comparative Examples 2 and 5 relate to ultra-low cement castables (ULCC), Comparative Example 3 relates to a quick drying composition (QD) and compositions 4 and 6 relate to compositions comprising colloidal silica (Col.Sil.).

Investigations of many properties of the dry refractory particulate compositions were carried out including the placement properties, drying aptitude and hot properties, as shown in Tables 3 to 8. Placement properties refer to working time, setting and green strength. For the investigations, the following tests were implemented:

Preparation of the Test Samples:

12.5 kg of the dry mixture was placed in a 10 $dm^3$ hemispheric stainless steel bowl with a paddle. The dry mixture was stirred at room temperature at a paddle rotation speed of 105 rpm for 3 minutes. Water was added in an amount shown in Table 1 and Table 2 and stirred for a further 3 minutes. When not further specified, water quantity added is defined by the quantity needed for reaching a flow value of 130%+/−5%. This is in particular the case for generating samples dedicated to green strength characterisation. Once the mixture was homogeneously wet, the mixture was placed in a mould and placed on a vibration table to densify the mixture and form the sample. The dimensions of the samples are as follows: (i) Shape A—Length: 230 mm, width: 114 mm, thickness: 64 mm; (ii) Shape B: Length: 230 mm; width: 64 mm; thickness: 54 mm; (iii) Shape C—Length: 125 mm, width: 25 mm, thickness: 25 mm or (iv) Shape D—Length: 160 mm; width: 40 mm; thickness: 40 mm. The mould is tightly fixed to the vibration table (no metallic noise) with a vibration frequency of 50 Hz and a vibration amplitude of 0.5 mm. Except for when carrying out the placement tests (flow, working & setting times) and for the drying test, the material is left inside the mould for curing for 48 hours at 20° C. in a moisture saturated atmosphere, then removed from mould. At the end of this step a green body is produced. The samples are dried at 110° C. 5° C. to constant mass and cooled to room temperature, taking care to avoid moisture pick-up, then fired under oxidizing conditions. After cooling, the samples are placed horizontally in the furnace, with the surfaces which were at the bottom during the preparation period remaining so. The samples are separated to allow circulation of hot gases. For firing under reducing conditions, the samples are placed in silicon carbide boxes containing metallurgical coke/black carbon and shut off with a lid sealed with a jointing material.

Flow Test:

The sample to be characterized (as per indicated by EN1402-4) by flow test is prepared as described above. A truncated, lubricated cone (mould) (a 70-100 mm, height 80 mm) is filled to the top with the sample, which is vibrated for 30 seconds before removing the mould. The sample is then vibrated for a further 30 seconds after removal of the mould. For ensuring a proper flow value measurement, the flattened heap must be circular and the measurement of 2 perpendicular diameters should not differ by more than 10 mm. The flow value is determined by the average of the two measured diameters, and calculation of the heap base diameter change (from 100 mm initial) expressed in %. Unless specified, liquid addition is chosen to get an initial flow of 130±5%.

Figure 6:
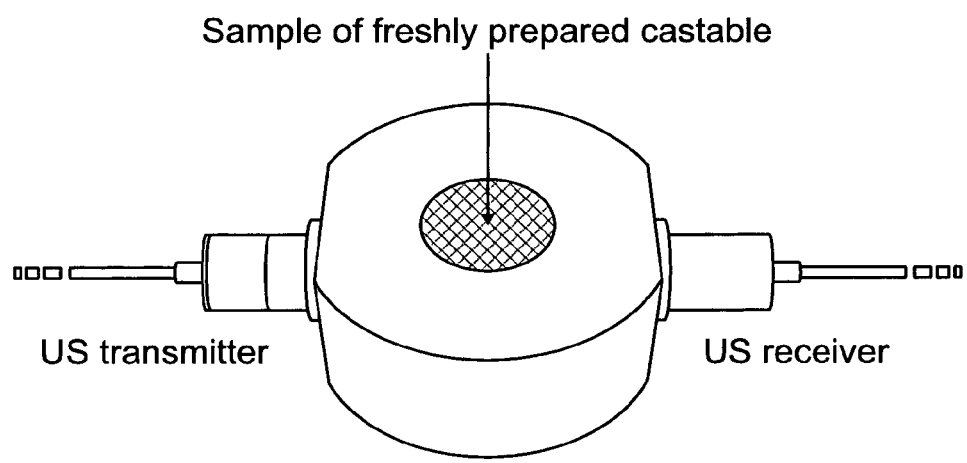
FIG. 6 represents the apparatus used for determining the working time and setting time

Test for the Determination of the Working and Setting Time:

Working time and setting time are estimated from the recording of the ultrasonic (US) velocity through a sample of freshly prepared castable using the test set up and software UltraTest IP-8 from UltraTest GmbH. The material is prepared as described above and placed in the measurement cell using the vibrating table (for entrained air removal). The working time is conventionally defined as the time from the end of the wet mixing of the castable at which the US velocity reaches 500 m/s. The setting time is conventionally defined as the time when the velocity reaches 4000 m/s. This threshold US velocity of 4000 m/s corresponds, for a high alumina castable, to a level of strength similar to the level reached at the "final set" with a Vicat needle. Also see FIG. 6.

Cold Crushing Strength:

Cold Crushing Strength (CCS) represents the ability of a product to resist failure under compressive load at room temperature. The material is prepared as described above. Cold crushing strength can be carried out: (i) after curing at 20° C. during 24 hrs→Green strength, (ii) after drying, or (iii) after firing at the desired temperature. Applying the stress perpendicular to the vibration direction when preparing the sample. Placing the sample in the ancillary so that the 64 mm edge (shapes A) the 54 mm edge (shape B) is vertical. Placing the 114 mm edge (shape A), or the 64 mm edges (shapes B) central to, and flush with the 120 mm edge of the lower plate. For both cases, the stress is applied smoothly and continuously at a rate of 1.0 MPa/s±0.1 MPa/s until the sample fails. The maximum load is then recorded. Calculate the cold crushing strength, σ using the equation:

$$\sigma = F_{max}/A0$$

wherein: $F_{max}$ is the maximum load recorded, in Newtons; Ao is given by the 65 mm edge of the platen and the width of the sample concerned (114 mm or 64 am) Express the cold crushing strength in MPa to the nearest 0.1 MPa.

Figure 7:
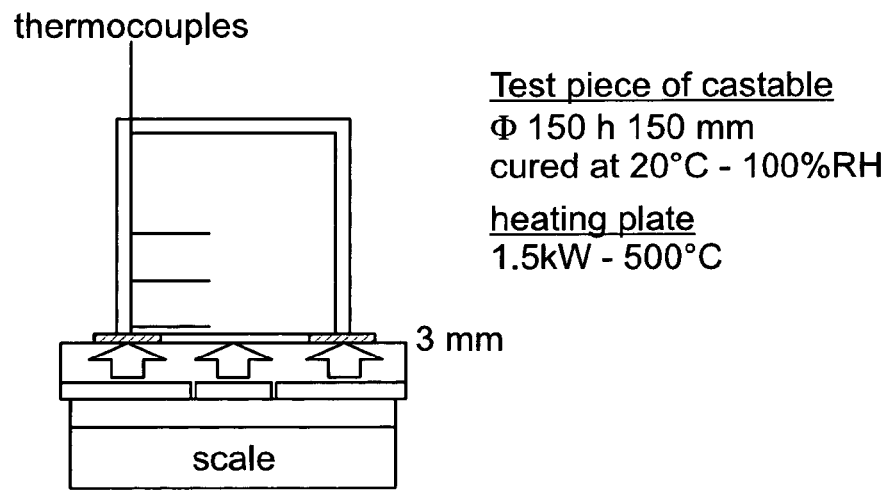
FIG. 7 represents the apparatus for carrying out the drying test

Drying Test:

The material is prepared as described above and placed in a moisture tight cylindrical mould using the vibrating table (for entrained air removal). The drying ability of the sample is assessed by recording the mass loss of the sample in a moisture tight cylindrical mould. The sample is first cured for 24 hours in a moisture saturated atmosphere. It is then heated up on one face, as shown in the following drawing. Drying in this case is considered as unidirectional (water vapour can only be removed from the heated surface: an opening between the sample and the heating plate being provided by 3 mm thick spacers). Also see FIG. 7.

Figure 8:
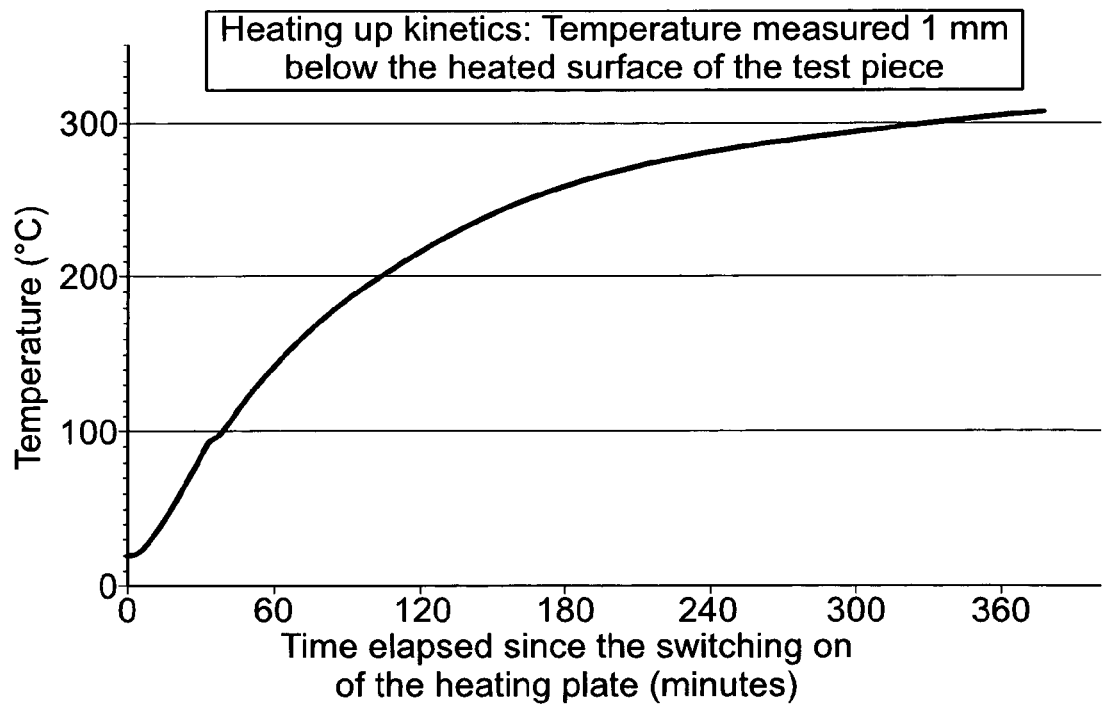
FIG. 8 represents the temperature measure 1 mm below the heated surface in the drying test.

At the start of the test, the heating plate is rapidly heated to 500° C. The temperature of the plate remains at 500° C. during the duration of the test. The temperature measured mm below the heated surface of the sample follows the kinetics shown in FIG. 8.

The degree of drying is calculated by dividing the mass loss by the initial amount of water present in the sample. The drying ability is determined by the degree of drying of the sample after 5 hours of heating.

Test Bulk Density, Apparent Porosity and True Porosity:

In accordance with ISO 5017 the bulk density and the apparent porosity were determined and the total porosity calculated.

Test HMOR (Hot Modulus of Rupture):

HMOR is a test method covering determination of the Hot Modulus of Rupture of monolithic refractories under action of a force on a sample that is increased at a constant rate in oxidizing atmosphere (see ASTM C 583-80). Sample consists of 5 samples made from monolithic refractory (Shape D for carbon containing refractory material/Shape C for standard refractory material). The material is prepared as described above and formed in suitable metal gang moulds. After curing and de-moulding, the test bars are dried at 110° C.±5° C. and then sintered for 5 hours (100° C.Hr−1) at i) 1450° C. for carbon containing refractory material under reducing conditions OR ii) 1500° C. for standard refractory material under air. The samples are set in the holding furnace without applied load and heat to the testing temperature using the following schedule:

Room temperature→600° C.: 10° C./min
600° C.→1000° C.: 8° C./min
1000° C.→1400 or 1450° C.: 6° C./min
Holding time: 30 min Following the holding period, the samples are moved to the supporting bearing edges. Then the top bearing edge is brought on sample to apply pressure through the loading until failure occurs. The rate of application of the load on the sample is 0.13 MPa·s-1 for samples with shape D and 0.15 MPa·s-1 for samples with shape C.

The modulus of rupture for each specimen is calculated as follows:

$$HMOR = 3PL/2bd2$$

where:
P=maximum load.
L=distance between supports.
b=width of the sample.
h=height of the sample.
The average hot modulus of rupture calculated from 4 measurements is expressed in MPa.

Test RUL (Refractoriness Under Load):

RUL i.e., Refractoriness Under Load) refers to a test method allowing determination of the deformation of a monolithic refractories under action of a constant compressive load and a progressive increase of temperature (see ISO 1893). Sample consists of cylindrical samples (height=50 mm, $Ø_{external}$=50 mm, $Ø_{internal}$=12 mm) drilled out from test bars 54×65×230 mm (shape B) preliminary sintered for 5 hours at 1000° C./1500° C. under air for refractory material or at 1500° C. under reducing conditions for carbon containing refractory material. Firing atmosphere during RUL test is air for refractory material or inert (5% $H_2$, 95% Ar) for carbon containing refractory material. The load is fixed to 300° C.Hr[1]. Sample deformation is registered versus temperature increase and temperatures corresponding to the maximum of dilatation and to specific deformations are determined ($T_{0.5\%}$, $T_{1\%}$, $T_{2\%}$ etc.).

Determination of Grain-Size Distribution of Aggregate

The grain-size distribution is measured by determining the amount of material retained on the range of sieves and is expressed as a percentage of the total initial dry mass of material.

Apparatus

Balance, capable of reading to the nearest 0.1 g.
Sieves, conforming to the requirements of ISO 565 and having a diameter of 200 mm or greater. List sieves: 30 mm, 10 mm, 6.3 mm, 3.15 mm, 2 mm, 1 mm, 0.5 mm, 0.25 mm, 0.125 mm, 0.080 mm and sieve bottom pan.
Drying oven, preferably with an exhaust.

Procedure

Sampling by successive quartering, to obtain the adapted quantity of sample (m1) for a single test, selecting in accordance with the maximum size grains: (i) maximum grain size up to 10 mm: 500 g or (ii) maximum grain size above 10 mm: 1000 g. Record the weight of the sample: $m_1$ expressed in terms of dry material.

Dry sieving: the test sample, prepared and weighed is sieved using the selected sieves, a receiver and an appropriate efficient sieve shaker. The total time of sieving is 10 min. Weigh the material remaining on each sieve and record the masses as $m_n$ where n is the millimeter size of the sieve.

Calculate the percentage of the sample, rn, retained on the sieve of mesh size n using the equation:

$$r_n = \frac{m_n}{m_1} \times 100$$

Where: $m_n$ is the mass retained on sieve of mesh size n, in grams;
$m_1$ is the mass of the sample.

The aggregates which consist of particles with grain size distribution of between 0.08 and 30 mm→$r_{30}$=0 and $r_{sieve\ bottom\ pan}$=0

The aggregates which consist of particles with grain size distribution of between 0.08 and 10 mm→$r_{10}$=0 and $r_{sieve\ botom\ pan}$=0

Sedigraph Description

The X-ray gravitational sedimentation technique for determining the relative mass distribution of a sample by particle size (Particle Size Distribution) is based on two physical principles: the sedimentation theory which describes the velocity for an isolated sphere settling in a viscous fluid under the influence of a gravitational field (i.e., settling velocity is proportional to particle size) and the absorption of X-ray radiations (i.e., X-ray attenuation is proportional to mass concentration). These two theories are embodied in an analytical instrument called the SediGraph III supplied by Micromeritics Instruments Corporation, Norcross, Ga., USA (telephone: +1 770 662 3620; web-site: www.micromeritics.com). Such machine measures the gravity-induced settling rates of different size particles in a liquid with known properties by a person skilled in the art (pure ethanol for minerals reacting with water, deionized water with 0.1% sodium hexa-metaphosphate for non-reactive minerals with water), allowing the determination of the relative mass distribution of a sample by particle size as well as the maximum particle size. SediGraph III provides a plot of the cumulative percentage by weight of particles having a size, referred to in the art as the "equivalent spherical diameter" (esd), less than given esd values. The meaning of particle size $d_{50}$ is the value determined in this way of the particle esd at which there are 50% by weight of the particles which have an equivalent spherical diameter less than that $d_{50}$ value.

Method for Measuring the Particle Size of Hydratable Alumina

The particle size of hydratable alumina was determined using Microtrac SRA 150, a granulometer based on the diffraction of a laser beam by the particles.

Method for Measuring the Particle Size of the Calcium Source

The maximum particle size of calcium source is controlled by dry sieving using sieves of appropriated openings such as 80 μm, 125 μm, 150 μm, 200 μm, 250 μm. The maximum particle size is determined by the smallest opening sieve on which less than 5 weight % of initial sample is remaining and measurable after below procedure. The sample size must be suited to the size of the sieve (100 g maximum for a sieve with a diameter of 20 cm).

Sieves are fitted in proper order to a receiving pan and the test sample is added on the surface of the sieve column and a cover is fitted on top of the sieve. The whole assembly is fixed to a shaker and shaken for 10 minutes. An additional brushing step is performed during which the material remaining on the 80 microns sieve is lightly moved on the sieve using a soft brush until the mass of the oversize material becomes constant, then mass of remaining sample is measured on each sieve.

Table 3 shows the placement properties for Example 1 and Comparative Examples 1 to 4.

TABLE 3

| | 1 | Comp 1 LCC | Comp 2 ULCC | Comp 3 QD | Comp 4 Col. Sil. |
|---|---|---|---|---|---|
| Water addition (water/powder, %) | 3.8 | 3.8 | 3.8 | 5.0 | 7.65 |
| Colloidal silica add. (C.S./powder, %) | | | | | |
| Initial flow (%) | 167 | 158 | 148 | 138 | 130 |
| Working time (min) | 130 | 140 | 120 | 24 | 80 |
| Setting time (min) | 210 | 370 | 770 | >1440 | no real set |
| Green Strength (MPa) | 14 | 56 | 18 | <4 | <1 |

It can be seen that the flow reached after the same amount of water addition (3.8%) is not as good for the state of the art LCC and ULCC compositions as the flow exhibited by Example 1. A higher water addition is required to place the QD composition (i.e. to reach the minimal targeted value of 130% for flow test, which is furthermore significantly lower than flow exhibited by Example 1 (167%)).

The amount of colloidal silica necessary to pace composition "Comp. 4" (i.e. to reach the minimal targeted value of 130% for flow test, which is significantly lower than flow exhibited by Example 1 (167%)) is (7.65%), which brings 4.5% water to the dry composition (40% silica in the colloidal silica suspension). A high water addition brings more open porosity after dry out (free and bonded water removal). A low open porosity is a key requirement for hot face refractory linings since open porosity is the path for metal and slag penetration inside the lining. More open porosity also reduces strength.

It can also be seen that working time of Example 1 is long and setting time short, which makes site installation very easy. This means that there is enough time to place/form the material after mixing and a short time before formwork can be removed. This advantageous behavior is illustrated in FIG. 1: The increase of US velocity with time shows the hardening of the freshly casted materials.

The green strength (strength after 24 hours curing at 20° C. in a moisture saturated atmosphere simulating the conditions inside a large cast piece) of Example 1 is nearly as good as with the ULCC and much better than with the QD or the colloidal silica bonded castables. Compressive strength of a castable must reach at least 5 MPa before formwork, which is used to contain the castable during casting, can be removed without damaging the lining. A curing time longer than 24 hours, or countermeasures to cope with a low green strength (such as heating the lining with the formwork), are important drawbacks.

Table 4 shows the drying ability for Example 1 and Comparative Examples 1 to 4.

TABLE 4

|  | 1 | Comp 1 LCC | Comp 2 ULCC | Comp 3 QD | Comp 4 Col. Sil. |
|---|---|---|---|---|---|
| Degree of unidirectional drying after 5 hours (%) | 38 | 14 | 37 | 38 | 71 |

Figure 2:
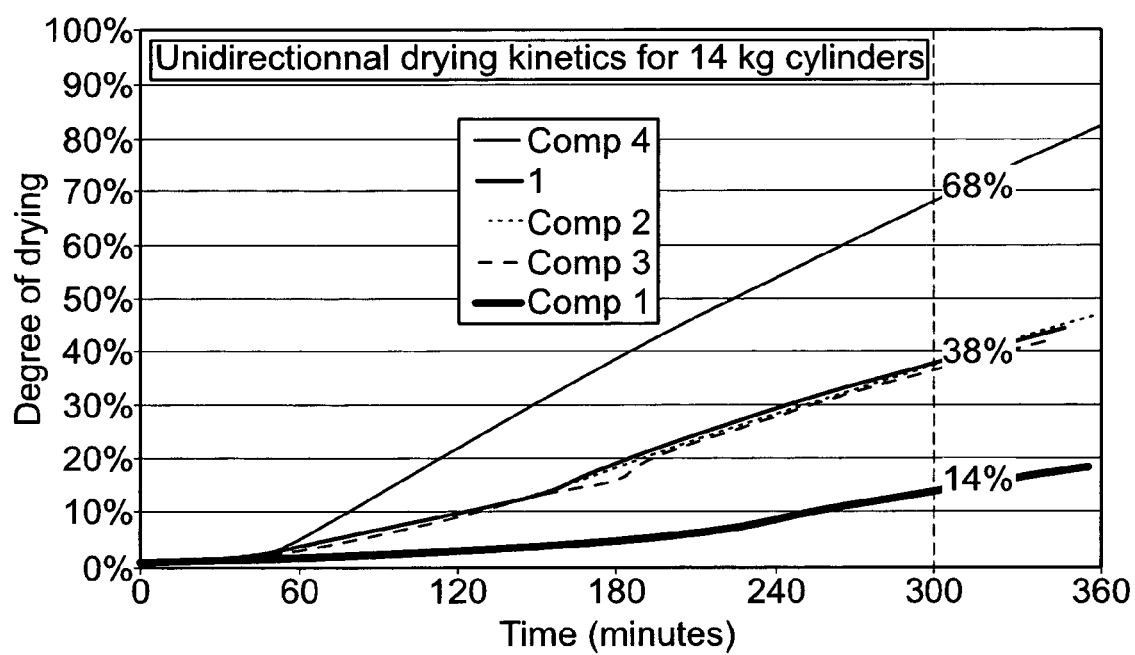
FIG. 2 is a graph representing the unidirectional drying kinetics for 14 kg cylinders (Example 1 and Comparative Examples 1 to 4)

The specific test described above shows that Example 1 dries as fast as the Quick Drying castable. See FIG. 2 which reports the drying kinetics (degree of drying as a function of time). The faster the castables dries, the smaller the pressure build-up within lining due to water vaporisation a constrained environment and thus the lower the risk of steam spalling.

Table 5 shows the properties at high temperature for Example 1 and Comparative Examples 1 to 4.

TABLE 5

|  |  | 1 | Comp 1 LCC | Comp 2 ULCC | Comp 3 QD | Comp 4 Col. Sil. |
|---|---|---|---|---|---|---|
| Refractoriness under Load (0.1 MPa) | Temp. @ max expansion (° C.) | 1542 | 1436 | 1601 | 1557 | 1541 |
|  | Temp. @ max expansion - 0.1% (° C.) | 1690 | 1446 | 1687 | 1645 | 1656 |
| Hot Modulus of Rupture at 1400° C. | H.M.O.R (MPa) | 15 | 6.7 | 11 | 5.6 | 4.2 |

For both the R.U.L. and the H.M.O.R. tests, the samples were fired before testing at 1500° C. for 5 hours.

Figure 4:
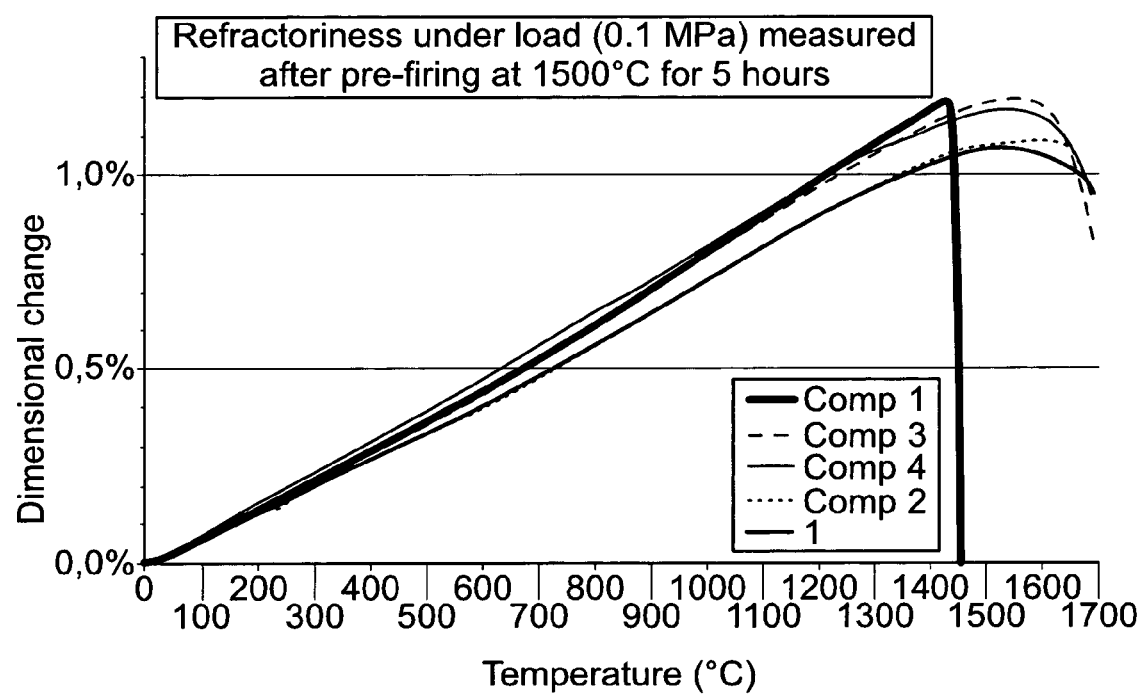
FIG. 4 is a graph representing refractoriness under load (0.1 MPa) measured after pre-firing at 1500° C. for 5 hours (Example 1 and Comparative Examples 2 to 4)

FIG. 4 shows the deformation under load when heating the samples up to 1700° C.

Example 1 reaches its maximum expansion at 1542° C. and start to slump significantly (0.1% slump) at 1690° C. This is the highest temperature reached before thermoplasticity.

Similarly, Example 1 exhibits the best hot strength (hot modulus of rupture).

Both properties demonstrate that Example 1 exhibit a very good refractoriness, that is to say that Example 1 can withstand mechanical abuse and load at high temperature.

An example of an application where such refractoriness is required is the hot face lining of steel lades, in which molten steel at 1600° C. is poured and treated.

To summarize, Example 1 shows the best combination of properties compared to any other castable with the same grain skeleton: it exhibits very good placement properties with a long working time and quick cement like hardening, good drying ability and very good refractoriness. Comparative Example 1 has the drawbacks of a difficult (and dangerous) drying as well as a low refractoriness. Comparative Example 2 has a long setting time and a lower refractoriness. Comparative Example 3 has a higher water demand (higher open porosity), very long setting time, low green strength and lower refractoriness. Comparative Example 4 has the drawback of a very low green strength.

Table 6 shows the green strength for Example 2 and Comparative Examples 5 and 6.

TABLE 6

|  | 2 | Comp 5 ULCC | Comp 6 Col. Sil. |
|---|---|---|---|
| Water addition (water/powder, %) | 4.0 | 4.1 | 7.30 |
| Colloidal silica add. (C.S./powder, %) |  |  |  |
| Initial flow (%) | 130 | 133 | 135 |
| Green Strength (MPa) | 10 | 15 | 3 |

The colloidal silica addition necessary to reach the targeted initial flow for Comparative Example 6 is equivalent to the addition of 4.4% water (colloidal silica concentration: 40%).

In particular, the composition according to the invention is characterized by a higher crushing strength of the green body than the art composition relative to the colloidal silica bonded Comparative Example 6. Precautions are required when green strength is lower than 5 MPa for demolding safely after the curing period to avoid apparition of flaws and defects in the refractory lining. For safety reason, the use of a consumable form mesh is often required when colloidal silica bonded material is installed in a bast furnace trough runner, but not required by Example 2 according to the invention.

Table 7 shows the drying ability for Example 2 and Comparative Examples 5 & 6.

TABLE 7

|  | 2 | Comp 5 ULCC | Comp 6 Col. Sil. |
|---|---|---|---|
| Degree of unidirectional drying after 5 hours (%) | 66 | 62 | 79 |

Figure 3:
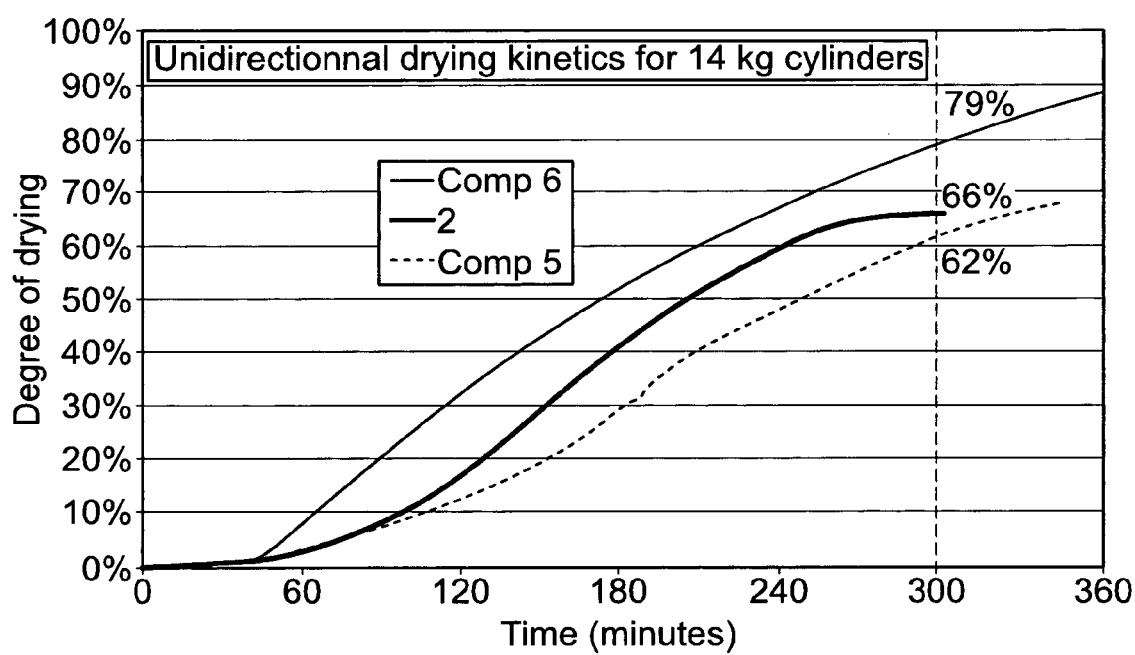
FIG. 3 is a graph representing the unidirectional drying kinetics for 14 kg cylinders (Example 2 and Comparative Examples 5 and 6)

Example 2 presents a higher degree of drying after 5 hours than the art composition relative to the LCC material. The combination of properties exhibited by the Example 2 according to the invention show marked improvements over the prior art compositions as shown in Table 7 and FIG. 3. Combined with its high green crushing strength which is required to withstand the generated internal steam pressure during first heating, the drying aptitude of Example 2 is improved. The particular design and constraints of blast furnace runners, i.e., high refractory lining thickness, quick commissioning, installation on warm residual lining, require refractory castable that can be dried out very fast. The better drying aptitude exhibited by Example 2 according to the invention represents an advantage compared to the standard ULCC technology.

Table 8 shows the properties at high temperature for Example 2 and Comparative Examples 5 & 6.

TABLE 8

|  |  | 2 | Comp 5 ULCC | Comp 6 Col. Sil. |
|---|---|---|---|---|
| Refractoriness under Load (0.1 MPa) | Temp. @ max expansion - 0.1% (° C.) | 1526 | 1356 | 1523 |
| Hot Modulus of Rupture at 1450° C. | H.M.O.R. (MPa) | 4.8 | 0.9 | 4.5 |

Figure 5:
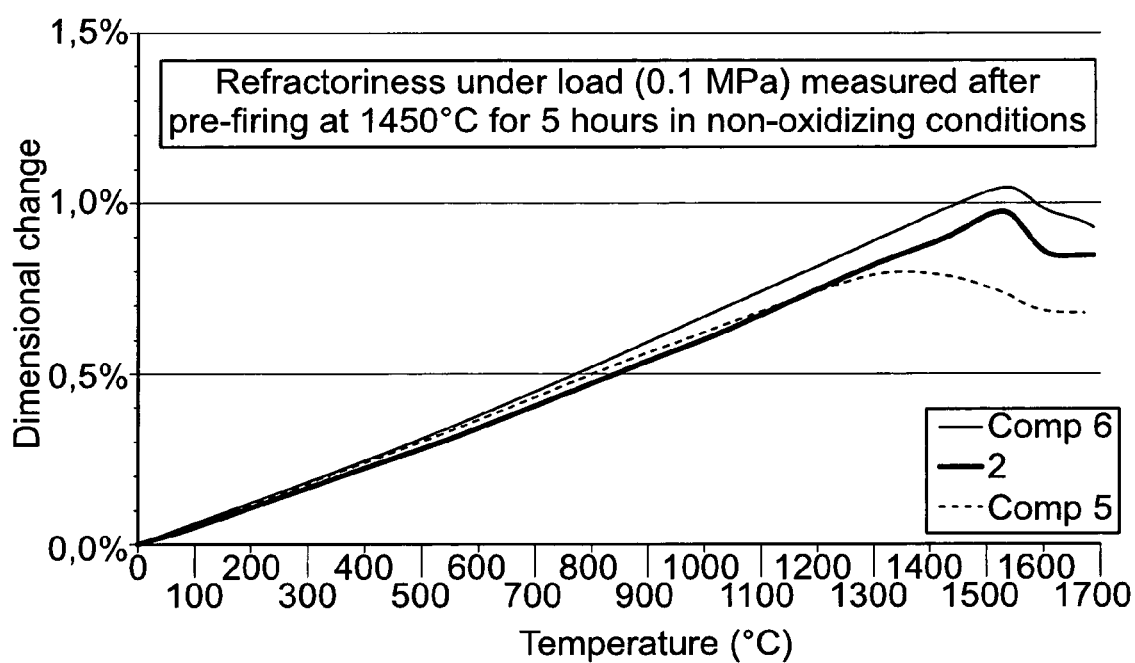
FIG. 5 is a graph representing refractoriness under load (0.1 MPa) measured after pre-firing at 1450° C. for 5 hours in non-oxidizing conditions (Example 2 and Comparative Examples 5 and 6)

Example 2 exhibits a higher hot modulus of rupture and a higher temperature before slump under load than the art composition relative to the ULCC material (FIG. 5), resulting from the reduction of the lime content from 0.5% (Comp.5) to 0.2% (Example 2) which is prone to form low melting phases when associated with alumina and silica. The high hot strength developed by Example 2 according to the invention allows improving the durability of the refractory lining during service at the impact of the iron stream in a main and in a tilting blast furnace runner and represents an advantage compare to the standard ULCC technology.

Altogether, Example 2 shows the best combination of properties compared to any other castable with the same grain skeleton: good drying aptitude, high crushing strength of the green body and very good refractoriness. Comparative Example 5 has a lower refractoriness and presents a less good drying aptitude. Comparative Example 6 has the strong drawback of a very low green strength.

The invention claimed is:

1. A dry refractory particulate composition comprising:
   5% to 95% by weight of an aggregate,
   1% to 8% by weight of a silica fume,
   0.1% to 1.5% by weight of a hydratable alumina,
   0.1% to 1% by weight of a calcium source, and
   0.01% to 1% by weight of a dispersant,
   wherein the aggregate is not a hydratable alumina or a silica fume;
   wherein the calcium source is selected from calcium aluminate cement, Portland cement, hydrated lime, calcium sulfate, calcium acetate, calcium chloride, calcium chlorate or mixtures thereof;
   wherein the calcium aluminate cement and Portland cement have a particle size of up to 80 microns, and the hydrated lime, calcium sulfate, calcium acetate, calcium chloride, calcium chlorate have a particle size of up to 200 microns,
   wherein the calcium oxide content is no greater than 0.3% by weight, and
   wherein all percentages by weight are based on the total dry weight of the dry refractory composition.

2. The dry refractory particulate composition of claim 1, wherein a green body obtained therefrom has a green crushing strength of at least 6 MPa.

3. The dry refractory particulate composition of claim 1, wherein the aggregate is selected from alumina, aluminosilicate, zirconia, zircon, magnesia, olivine, chromium oxide or chrome ores, spinel, silicon carbide, or mixtures thereof.

4. The dry refractory particulate composition of claim 1, wherein the dispersant is selected from polyphosphate, polycarboxylate, polycarboxylate ether, polynaphthalene, polymelamine, polyglycol, lignosulfonate, and citric acid.

5. The dry refractory particulate composition of claim 1, wherein the hydratable alumina has a BET surface area in the range of 200 to 350 $m^2/g$ and/or a median particle size, $d_{50}$, in the range of 3 to 10 µm as measured by laser diffraction using a Microtrac SRA 150.

6. The dry refractory particulate composition of claim 1, wherein the hydratable alumina includes rho alumina.

7. The dry refractory particulate composition of claim 1 comprising no more than 1.0% by weight of organic binder.

8. The dry refractory particulate composition of claim 1, wherein the silica fume has a BET surface area in the range of 8 to 25 $m^2/g$ and/or a median particle size, $d_{50}$, in the range of 0.25 to 0.8 µm as measured by sedimentation using a Sedigraph III.

9. The dry refractory particulate composition of claim 1, further including up to 0.1% by weight of a setting acceleration agent selected from lithium carbonate, lithium hydroxide, calcium aluminate, sodium silicate, sodium aluminate, calcium hydroxide, sodium nitrate, sodium nitrite or mixtures thereof.

10. The dry refractory particulate composition of claim 1, further including a setting retardation agent selected from citric acid, sodium citrate, boric acid, oxalic acid, or mixtures thereof.

11. The dry refractory particulate composition of claim 1, having a working time ranging from 30 to 240 min and/or having a setting time ranging from 1 to 12 hours, at 20° C. measured using UltraTest IP-8.

12. The dry refractory particulate composition of claim 1, having a total amount of bonded water lower than 0.7% as measured by water released between 110° C. and 800° C.

13. The dry refractory particulate composition of claim 1, having a drying aptitude with a degree of unidirectional drying higher than 30% after 5 hours as measured in a moisture tight cylindrical mould, wherein the mould is heated to 500° C. on an open face.

14. The dry refractory particulate composition of claim 1, further comprising:
   5% to 50% by weight silicon carbide, and
   up to 10% by weight carbon.

15. The dry refractory particulate composition of claim 14, further comprising 1% to 10% by weight carbon.

16. The dry refractory particulate composition of claim 14, wherein the carbon is selected from carbon black, pitch, petroleum pitch, graphite, coke, solid hydrocarbon having a carbon residue of at least 5% by weight after coking, asphalts, and mixtures thereof.

17. The dry refractory particulate composition of claim 14, further comprising up to 5% by weight of an antioxidant.

18. The dry refractory particulate composition of claim 17, wherein the antioxidant is selected from aluminium nitride, aluminium oxy-nitride, boron carbide, zirconium carbide, calcium carbide, a metal and mixtures thereof; wherein the metal is selected from the group consisting of aluminium, silicon, magnesium, iron, chromium, zirconium, or an alloy thereof.

* * * * *